United States Patent [19]
Iwama et al.

[11] Patent Number: 6,020,067
[45] Date of Patent: Feb. 1, 2000

[54] PHOSPHOR HAVING SURFACE COATED WITH A QUATERNARY SALT-CONTAINING COMPOUND

[75] Inventors: Tetsuji Iwama, Susono; Noboru Matsuhisa, Hakone; Masami Hirono, Hadano; Masaru Naito, Isehara; Makoto Hattori, Odawara, all of Japan

[73] Assignee: Kasei Optonix, Ltd., Tokyo, Japan

[21] Appl. No.: 08/925,771

[22] Filed: Sep. 9, 1997

[51] Int. Cl.[7] .................................................... B32B 5/16
[52] U.S. Cl. ............................................ 428/403; 428/404
[58] Field of Search ..................................... 428/403, 404

[56] References Cited

U.S. PATENT DOCUMENTS

| | | |
|---|---|---|
| 3,544,354 | 12/1970 | Kachel et al. ........................ 117/33.5 |
| 3,927,224 | 12/1975 | Levene ....................................... 427/64 |
| 5,141,672 | 8/1992 | Gowan, Jr. . |
| 5,196,229 | 3/1993 | Chau ........................................ 427/66 |
| 5,744,233 | 4/1998 | Opitz et al. ............................. 428/328 |
| 5,750,203 | 5/1998 | Chung ..................................... 427/380 |

FOREIGN PATENT DOCUMENTS 20 82 740   6/1997   Russian Federation .

*Primary Examiner*—Hoa T. Le
*Attorney, Agent, or Firm*—Oblon, Spivak, McClelland, Maier & Neustadt, P.C.

[57] ABSTRACT

A phosphor having a surface coated with a metal alkoxide containing a quaternary ammonium salt.

7 Claims, No Drawings

PHOSPHOR HAVING SURFACE COATED WITH A QUATERNARY SALT-CONTAINING COMPOUND

BACKGROUND OF THE INVENTION

1. Field of the Invention

The present invention relates to a phosphor suitable for a display device such as a cathode ray tube efficiently light-emitting at excitation by electron beam, ultraviolet ray or the like. Particularly, the present invention relates to a phosphor capable of improving a packing density of a phosphor in a phosphor film coated by a slurry coating method, a paste coating method or the like, improving a dispersibility of a phosphor and forming a dense phosphor film, and also capable of enhancing a luminance of a phosphor film and forming an image excellent in color purity and contrast.

2. Prior Art

A phosphor screen of a display device such as a cathode ray tube, is provided with a black matrix (hereinafter referred to as "BM") comprising a black non-luminant material on the inside surface of a face plate (glass-made panel) to improve a contrast, and a precoat layer comprising polyvinyl alcohol (PVA) or the like is formed on the black matrix (BM) to get the face plate well matched with a phosphor slurry. Thereafter, each phosphor slurry of three colors of G (green), B (blue) and R (red) is coated thereon in order and a phosphor film is formed by photographic printing method (exposure and development).

A "fogging" phenomenon occurring during this phosphor film-forming step deteriorates a color purity and a contrast of a phosphor screen. The above fogging phenomenon is classified as illustrated below.

(1) "fogging on BM": A phenomenon of deteriorating a contrast by a phosphor remained and deposited on a black matrix (BM);
(2) "fogging on glass": A phenomenon of deteriorating a color purity of a phosphor film formed on a surface having a previously coated phosphor remained and deposited; and
(3) "cross contamination": A phenomenon of deteriorating color purity of a previously coated color phosphor film due to the presence of phosphor particles coated thereafter.

For example, "B/G" cross contamination means B contamination on a G phosphor film, and "R/G" cross contamination means R contamination on a G phosphor film.

It is therefore demanded to improve phosphor particles so as to reduce "fogging", thereby improving a color purity and a contrast, and to improve a packing density of a phosphor, thereby improving a luminance of a phosphor film.

In order to solve the above-mentioned problems caused by a fogging phenomenon and a phosphor packing density of a phosphor film, the present inventors have studied to chemically treat a phosphor surface with various surface-treating materials, and have discovered that the phosphor packing density and the fogging phenomenon are related to an isoelectric point of zeta potential of the surface-treated phosphor surface and a blow-off charge generated when contacted with beads covered with PVA, and that the above problems can be solved by coating the phosphor with a specific surface treating material.

Thus, the present invention is to provide a phosphor wherein a packing density for forming a phosphor film is improved and a fogging phenomenon can be prevented, by treating a phosphor surface with a specific material.

In order to solve the above problems, it has been proposed to modify a phosphor surface by adding a specific organic compound and/or inorganic compound thereto (see JP-B-63-66876, JP-A-63-284290, JP-A-3-273088, JP-B-7-116428, JP-A-1-284583, JP-A-5-28967 and JP-B-44-11769), but it has been found by the present inventors that these proposals do not always provide a phosphor having a satisfactory packing density for forming a phosphor film and preventing a fogging phenomenon.

For example, when a phosphor surface is modified by uniformly treating with an anionic compound, i.e. a negatively chargeable material such as silicon dioxide and acrylic resin as described in JP-B-63-66876 or a nonionic compound such as polystyrene resin as described in JP-B-64-5737, an isoelectric point of zeta potential of the phosphor thus treated can be made about 7 or lower, but a blow-off charge is also lowered, thereby generating a fogging phenomenon.

Further, according to JP-B-63-66876 and JP-A-3-273088, a phosphor surface is modified by treating with a cationic material, i.e. a positively chargeable material such as an alkali metal or alkaline earth metal oxide, a coupling agent having an amino group or the like, and a blow-off electric charge of the phosphor thus treated can be made about 5 $\mu$C/g or higher, thereby reducing a fogging phenomenon and improving a color purity and a contrast of the phosphor screen, but an isoelectric point of zeta potential is raised to about 7 or higher, thereby lowering a phosphor packing density for forming the phosphor film and also lowering a luminance.

In the present invention, "blow-off charge" means a blow-off charge generated when contacted with beads of a particle size of from 200 to 800 $\mu$m, the surface of which is coated with PVA.

SUMMARY OF THE INVENTION

The above-mentioned problems have been solved by providing a phosphor having the following structures in accordance with the present invention.

(1) A phosphor characterized by having a surface coated with a metal alkoxide containing a quaternary ammonium salt.
(2) The phosphor as defined in the above paragraph (1), wherein the metal alkoxide has the following general formula:

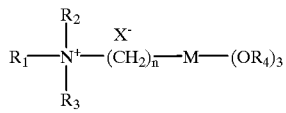

R$_1$ to R$_3$: a C$_1$–C$_{24}$ alkyl or allyl group
R$_4$: a C$_1$–C$_4$ alkyl group
M: Si, Ti or Zr
X: a halogen ion
n: an integer of from 1 to 8.

(3) The phosphor as defined in the above paragraph (2), wherein M is a Si element.
(4) The phosphor as defined in any of the above paragraphs (1) to (3), wherein the phosphor surface is coated with an anionic organic compound and/or inorganic compound and then with the metal alkoxide.
(5) A phosphor characterized by having a surface coated with nonionic or anionic compound particles and a quaternary ammonium salt-containing compound.
(6) The phosphor as defined in the above paragraph (5), wherein the anionic compound is a silicon compound and/or carboxy-modified acrylic resin.

(7) The phosphor as defined in the above paragraph (5), wherein the nonionic compound is polystyrene resin.

(8) The phosphor as defined in any of the above paragraphs (1) to (7), wherein the phosphor surface has an isoelectric point of electrokinetic potential (zeta ($\zeta$) potential) of at most 7, and is charged with a blow-off electric charge of at least 5 $\mu$C/g when contacted with beads of a particle size of from 200 to 800 $\mu$m having a surface coated with polyvinyl alcohol.

DETAILED DESCRIPTION OF THE INVENTION

According to the present invention, the above problem can be solved by providing a phosphor having a surface which has an average isoelectric point value of zeta potential of at most 7 and is charged with a blow-off charge of at least 5 $\mu$C/g when contacted with beads coated with polyvinyl alcohol.

Examples of a core phosphor used in the first phosphor as defined in the above paragraph (1) of the present invention, include a phosphor for a phosphor film of a display device such as a ZnS:Ag, Al blue-emitting phosphor, a ZnS:Ag, Cl blue-emitting phosphor and a ZnS:Zn blue-emitting phosphor, or a $Y_2O_3$:Eu red-emitting phosphor and a $Y_2O_2S$:Eu red-emitting phosphor, or a ZnS:Cu, Al green-emitting phosphor and a ZnS:Cu, Au, Al green-emitting phosphor, or the like, for a cathode ray tube. In addition to the above examples, any other phosphors usable for a usual display device can be used as a core phosphor for the first phosphor of the present invention.

A particle size of a phosphor is usually in the range of from about 1 to 10 microns, and is optionally selected depending on an definition required for a phosphor film of a display device.

Examples of a silane compound used for treating a phosphor include a hydrophobic compound disclosed in JP-B-53-17555 and JP-B-62-4778, and an amino group-containing silane compound disclosed in JP-B-63-66876, but these compounds have disadvantages that a blow-off charge on the coated surface of a phosphor surface is hardly raised and that an amino group is liable to be hydrolyzed in a coating slurry, thereby raising a pH value in the slurry and consequently lowering an exposure sensitivity.

A metal alkoxide compound containing a quaternary ammonium salt used in the first phosphor of the present invention (hereinafter simply referred to as "alkoxide compound") suitably has an alkyl group or an allyl group on the side chain of the ammonium salt in the alkoxide compound. Examples of the alkoxide compound include a compound having the above-mentioned general formula, and particularly an alkoxide compound having a —$OCH_3$, —$OC_2H_5$, —$OC_3H_8$ or —$OC_4H_9$ group as an alkoxyl group is preferable since it stabilizes hydrophilic nature and hydrolysis property of a phosphor surface after it is deposited thereon. Further, an alkyl group or an allyl group bonded to the side chain of the ammonium salt has a carbon number of from 1 to 24, preferably from 3 to 18, and if the carbon number increases, the ammonium salt becomes hardly dispersible in water when preparing a slurry. Thus, it is preferable to add a nonionic surfactant or the like in view of dispersibility. Further, n in the formula is suitably in the range of from 1 to 8, preferably from 2 to 4.

Examples of a metal element M include Si, Ti and Zr, and among them, a silane compound wherein M is Si is particularly suitable for the object of the present invention.

In the preparation of the first phosphor of the present invention, a phosphor surface may be previously coated with a surface treating agent such as a specific anionic organic compound and/or inorganic compound other than "alkoxide compound", as described in JP-A-63-284299.

Examples of the anionic organic compound to be previously coated on a phosphor surface, include a binder for adhering a pigment on a phosphor, a dispersant for improving dispersibility of a phosphor in a phosphor slurry such as sodium polyacrylate, sodium citrate, gum arabic or carboxy-modified cellulose, and the like.

Also, examples of the anionic inorganic compound to be previously coated on a phosphor surface, include a hydroxide of Si, P, Ge, Ti or Zn having a hydroxyl group in a molecule, and a material capable of coupling deposition with "alkoxide compound" is particularly preferable. Further, these compounds are incorporated into a phosphor slurry to adjust a pH value, and are preferably made minutely and uniformly present on the phosphor surface.

Also, a coated amount of a surface-treating compound comprising the above organic and/or inorganic compound may vary depending on a kind of a compound used and a coated state (its particle size, uniformity and the like) and a type and a particle size of a phosphor to be treated, but it is preferably from 50 to 2,000 ppm to the phosphor to be treated, more preferably from 200 to 500 ppm. If the coated amount is less than 50 ppm, a uniform coating can not be obtained, for example, when using a silica sol as a treating compound, and adhesiveness of "alkoxide compound" to the phosphor becomes poor and a satisfactory coating of "alkoxide compound" is hardly available. When the phosphor thus treated is used for preparing a phosphor film, a packing density of the phosphor in the phosphor film becomes poor and consequently a luminance of the phosphor film thus obtained is liable to be lowered.

Also, when the coated amount is more than 2,000 ppm, a silica sol, for example, is hardly adhered to a phosphor and is liable to be peeled from the phosphor, and it is considered that an effect of preventing fogging by a compound to be coupled with "alkoxide compound" is reduced.

Further, even when "alkoxide compound" having a side chain containing a carbon number of more than 11 and consequently having a poor affinity to water and a poor wetting property is used, it is possible to hydrophilize a phosphor surface by intervening a nonionic surfactant on the phosphor surface during and after coating.

In the present invention, "alkoxide compound" can be coated on a phosphor surface by incorporating "alkoxide compound" into a phosphor slurry having a phosphor to be treated (including a phosphor previously surface-treated with the above organic compound and/or inorganic compound) suspended in pure water, fully stirring the resultant slurry to hydrolyze, dehydrating and then drying.

At that time, an amount of "alkoxide compound" to be incorporated, may vary depending on a kind and a particle size of a phosphor to be treated and a composition (carbon number) of "alkoxide compound", but in order to uniformly coat on the surface of a phosphor, the amount of "alkoxide compound" to be incorporated, is generally from 100 to 3,000 ppm, preferably from 300 to 800 ppm to a phosphor to be treated. If the amount of "alkoxide compound" is less than 100 ppm, a blow-off charge generated when contacted with PVA-coated beads becomes less than 5 $\mu$C/g, thereby being unable to prevent fogging. On the other hand, if the amount of "alkoxide compound" exceeds 3,000 ppm, a phosphor is liable to be hardly adhered, and dispersibility, surface electric charge and hydrophilicity of a phosphor are liable to become unstable.

In addition to "alkoxide compound" of the present invention, JP-A-3-273088 illustrates a compound exhibiting a positive charge, such as a water-soluble high molecular compound including a quaternary ammonium salt adduct of polyvinyl alcohol, a quaternary ammonium salt adduct of polyallyl and the like, and a blow-off charge of at least about 5 $\mu$C/g can be provided on a phosphor surface, but the effect of the present invention can not be achieved by using these compounds respectively alone.

However, since "alkoxide compound" used as a treating agent for the first phosphor of the present invention is water-insoluble, it is satisfactorily adhered to a phosphor surface once it is adsorbed thereon and it can stably control a surface charge of a phosphor without being dissolved in a phosphor-coating slurry.

In addition to the above coating method, "alkoxide compound" can be coated on a phosphor surface by coupling "alkoxide compound" with a silica particle surface and depositing the resultant product on a phosphor surface in gas phase.

Hereinafter, a method for preparing the second phosphor as defined in the above paragraph (5) of the present invention is fully described.

A core phosphor used in the second phosphor as defined in the above paragraph (5) of the present invention may be the same in respect to a kind and a particle size as that used in the first phosphor as defined in the above paragraph (1) of the present invention.

A nonionic or anionic compound used for preparing the second phosphor of the present invention is an inorganic or organic material having an isoelectric point value of zeta potential of at most 7 on its particle surface, and appropriately reacts with a compound containing a cationic quaternary ammonium salt, thereby controlling an electric charge on a phosphor surface. Examples of the nonionic or anionic compound include inorganic silicon type compound particles such as silica sol, powdery silica or alkoxide silica hydrolyzate, or organic anionic carboxy-modified acryl emulsion, SBR particles, latex emulsion-polymerized with an anionic surfactant, or nonionic polystyrene particles. In case of organic particles, it is possible to prevent a fogging phenomenon caused due to softening by heat during drying in a phosphor film-forming step by adjusting MFT (a minimum temperature necessary for forming a continuous film) to at least 10° C.

The nonionic or anionic compound particles have a particle size preferably in the range of from 80 to 300 millimicrons (m$\mu$). When particles having a particle size of less than 80 m$\mu$ are used together with a quaternary ammonium salt-containing compound, phosphors are liable to aggregate and packing of phosphors in a phosphor film becomes poor. On the other hand, when particles having a particle size of more than 300 m$\mu$ are used, the particles are hardly adhere to a phosphor surface and an isoelectric point value of zeta potential is liable to be higher than 7 after the quaternary ammonium salt-containing compound is deposited, thereby packing of phosphors in a phosphor film becoming poor. A more preferable particle size range is from 100 to 200 m$\mu$. Particles having a particle size in this range are satisfactorily adhered to a phosphor surface, and a surface charge can be easily controlled in the system of coexisting with a cationic quaternary ammonium salt-containing compound.

Preferable examples of a quaternary ammonium salt-containing compound other than "alkoxide compound" used in the second phosphor of the present invention, include polyvinyl alcohol, a polydiallyl-quaternary ammonium salt adduct, a quaternary ammonium salt-added surfactant, a quaternary ammonium salt-added silane coupling agent and the like. These compounds are preferable because cationic properties of these quaternary ammonium salt-containing compounds are stronger than those of other cationic amino group-containing compounds, and easily raise a blow-off electric charge.

When the cationic quaternary ammonium salt-containing compound other than "alkoxide compound" used in the second phosphor is used alone, the aimed effect of the present invention can not always be achieved, but when it is used in combination with the above-mentioned nonionic or anionic compound, the both compounds appropriately react each other, thereby easily controlling a surface charge of a phosphor and achieving the object of the present invention.

In the same manner as in the first phosphor, the second phosphor of the present invention may also be previously surface-treated with various surface treating agent before being coated with the above nonionic or anionic compound particles and quaternary ammonium salt-containing compound.

The amount of the above nonionic or anionic compound particles to be coated on the second phosphor surface may vary depending on a kind and a particle size of a phosphor used and a particle size and a composition of the anionic or nonionic compound used, but in order to uniformly coat on the phosphor surface, it is generally used in an amount of from 500 to 8,000 ppm, preferably from 2,000 to 5,000 ppm.

When the amount of the above nonionic or anionic compound particles is less than 500 ppm, the phosphor thus obtained is liable to have an isoelectric point value of zeta potential of higher than 7 and packing of phosphors in a phosphor film becomes poor. On the other hand, when the amount of the nonionic or anionic compound particles is more than 8,000 ppm, adhesiveness to a phosphor surface becomes poor and the particles are separated from the phosphor surface and are liable to aggregate in a PVA slurry and reduce a blow-off charge amount to less than 5 $\mu$C/g, thereby deteriorating fogging property of the phosphor film and also deteriorating color purity and contrast.

Further, the amount of the quaternary ammonium salt-containing compound used may vary depending on a kind and a particle size of a phosphor to be treated, and a particle size and the strength of anionic property of nonionic or anionic compound particles, but in order to uniformly coat the phosphor surface, the quaternary ammonium salt-containing compound is used generally in an amount of from 100 to 3,000 ppm, preferably from 300 to 1,000 ppm, to a phosphor to be treated. When this amount is less than 100 ppm, a blow-off charge amount of a phosphor becomes less than 5 $\mu$C/g, thereby deteriorating fogging property of a phosphor film. On the other hand, when this amount is more than 3,000 ppm, the phosphor surface has an isoelectric point value of zeta potential of higher than 7 after coating the quaternary ammonium salt-containing compound, thereby packing of phosphors in a phosphor film becoming poor.

In the preparation of the second phosphor of the present invention, the above nonionic or anionic compound particles and the quaternary ammonium salt-containing compound may be added at the same time to a phosphor slurry, but the above nonionic or anionic compound particles and the quaternary ammonium salt-containing compound may be separately added and coated on a phosphor surface.

Also, after coating the quaternary ammonium salt-containing compound on the nonionic or anionic compound particles, the particles thus obtained may be coated on a phosphor surface. For example, when silica particles are used as the anionic compound particles and their surfaces are treated with the quaternary ammonium salt-containing compound, the silica particles thus treated may be coated on a phosphor surface in a gas stream.

EXAMPLES

Now, the present invention will be described in further detail with reference to Examples illustrating to use the phosphor of the present invention as a phosphor film for a color cathode ray tube. However, it should be understood that the present invention is not limited to such specific Examples, and is widely used for preparing a display device (such as a cathode ray tube) for the purposes of reducing a fogging phenomenon, improving a color impurity and a contrast, and improving a packing density of a phosphor in a phosphor film, thereby improving a luminance of the phosphor film to provide a satisfactory image.

Example 1

Treatment of Green Phosphor

A green phosphor (ZnS:Cu, Al) having an average particle size of 7.5 micrometers ($\mu$m) for a color cathode ray tube was surface-treated with an organic compound of gelatin/gum arabic (300 ppm), and a commercially available silica sol having an average particle size of 80 millimicrons (m$\mu$) in an amount of 5,000 ppm to the phosphor and a zinc sulfate aqueous solution in an amount of 400 ppm (in terms of zinc) to the phosphor were then added to an aqueous slurry of the above surface-treated phosphor, and were deposited on the phosphor surface after adjusting a pH value (hydrophilization step).

Thereafter, a quaternary ammonium salt-containing silane compound, i.e. dimethyloctadecyl-3-trimethoxysilylpropylammonium chloride having the following formula (1), was added to water and was hydrolyzed therein, and the hydrolyzed product thus obtained was added to the aqueous slurry of the above phosphor and in an amount of 500 ppm to the phosphor and was deposited on the phosphor to be treated (surface charge-controlling step).

Thereafter, the phosphor slurry was dehydrated and dried, and aggregated phosphors were loosened on a 500 mesh stainless-made sieve. Thereafter, G, B and R three color phosphor films were prepared by slurry-coating method, and "packing density of phosphor in phosphor film" and cross contaminations "B/G", "R/G" and "R/B" were observed.

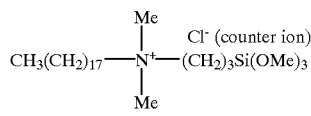

Me: Methyl group

Treatment of Blue Phosphor

A blue phosphor (ZnS:Ag, Cl) having an average particle size of 7.5 $\mu$m for a color cathode ray tube was coated with cobalt aluminate pigment (1.2 wt % to the phosphor) by using an acryl binder and gelatin/gum arabic, and a silica sol having an average particle size of 80 m$\mu$ in an amount of 5,000 ppm to the phosphor and a zinc sulfate aqueous solution in an amount of 500 ppm (in terms of zinc) to the phosphor were then added to an aqueous slurry of the pigment-coated phosphor to coat the silica sol on the phosphor surface after adjusting a pH value (coating of pigment and hydrophilization step).

Thereafter, dimethyloctadecyl-3-trimethoxysilylpropylammonium chloride having the above formula (1) (quaternary ammonium salt-containing silane compound) was hydrolyzed in water, and the hydrolyzed product was added to the aqueous slurry of the above phosphor to be deposited on the phosphor surface in an amount of 750 ppm to the phosphor, and was dehydrated and dried. The resultant product was powdered by a 500 mesh stainless-made sieve, and a phosphor film was prepared by slurry-coating method, and "packing density of phosphor in phosphor film" and cross contaminations "B/G", "R/G" and "R/B" were observed (surface charge-controlling step).

Treatment of Red Phosphor

A red phosphor ($Y_2O_2S$:Eu) having an average particle size of 7.5 $\mu$m for a color cathode ray tube was coated with 0.08 wt % of red iron oxide pigment ($Fe_2O_3$ pigment) by using gelatin/gum arabic (about 1,000 ppm to the phosphor), and a zinc sulfate aqueous solution in an amount of 200 ppm (in terms of zinc) to the phosphor was then added to the aqueous slurry of the pigment-coated phosphor, and was coated on the phosphor surface after adjusting a pH value (coating of pigment and hydrophilization step).

Thereafter, a hydrolyzed product of dimethyloctadecyl-3-trimethoxysilylpropylammonium chloride (quaternary ammonium salt-containing silane compound) was added to the aqueous slurry of the above red iron oxide pigment-coated phosphor, and was deposited on the outermost surface of the phosphor in an amount of 300 ppm to the phosphor to be treated (surface charge-controlling step).

After dehydrating and drying, the resultant product was powdered by a 500 mesh stainless-made sieve. Thereafter, a phosphor film was prepared by slurry-coating method, and "packing density of phosphor in phosphor film" and cross contaminations "B/G", "R/G" and "R/B" were observed.

Example 2

The same procedure as in Example 1 was repeated, except that the quaternary ammonium salt-containing silane compound was coated on the green phosphor (ZnS:Cu, Al) in an amount of 300 ppm to the phosphor, and cross contaminations were observed in the same manner as in Example 1.

Example 3

The same procedure as in Example 1 was repeated, except that the quaternary ammonium salt-containing silane compound was coated on the cobalt aluminate pigment-coated blue phosphor (ZnS:Ag, Cl) in an amount of 300 ppm to the phosphor, and cross contaminations were observed in the same manner as in Example 1.

Example 4

The same procedure as in Example 1 was repeated, except that the quaternary ammonium salt-containing silane compound was coated on the red iron oxide pigment-coated red phosphor ($Y_2O_2S$:Eu) in an amount of 500 ppm to the phosphor, and cross contaminations were observed in the same manner as in Example 1.

Comparative Example 1

The same procedure as in Example 1 was repeated, except that the quaternary ammonium salt-containing silane compound was omitted in the respective surface treatment steps of the green phosphor (ZnS:Cu, Al), the cobalt aluminate pigment-coated blue phosphor (ZnS:Ag, Cl) and the red iron oxide pigment-coated red phosphor ($Y_2O_2S$:Eu), and cross contaminations were observed in the same manner as in Example 1.

Comparative Example 2

The same procedure as in Example 1 was repeated, except that the quaternary ammonium salt-containing silane compound was omitted in the surface treatment steps of the green phosphor (ZnS:Cu, Al) and the red iron oxide pigment-coated red phosphor ($Y_2O_2S$:Eu), and cross contaminations were observed in the same manner as in Example 1.

Comparative Example 3

The same procedure as in Comparative Example 1 was repeated, except that an alumina sol was added in an amount of 500 ppm to the phosphor to adjust a pH value and to raise an isoelectric point value of zeta potential higher than that of each phosphor of Comparative Example 1 when treating with the silica sol and the zinc sulfate in the respective steps of coating gelatin/gum arabic on the green phosphor (ZnS:Cu, Al), the cobalt aluminate pigment-coated blue phosphor and the red iron oxide pigment-coated red phosphor ($Y_2O_2S$:Eu), and cross contaminations were observed in the same manner as in Comparative Example 1.

Evaluation

With regard to phosphor films obtained in Examples 1 to 4 and Comparative Examples 1 to 3, various properties (phosphor packing density in phosphor film and cross contamination) and phosphor surface charge (isoelectric point value of zeta potential and blow-off charge) were evaluated, and the results are shown in the following Table 1. Each evaluation method in Table 1 is illustrated below.

(1) Phosphor Film Properties (a) Packing Density

Each color phosphor was dispersed in an aqueous solution containing polyvinyl alcohol (PVA), ammonium bichromate (ADV) and a surfactant to prepare a phosphor coating slurry. A black matrix (BM) was provided on the inside of a face plate of a cathode ray tube and a precoat layer comprising PVA was formed thereon. Thereafter, each of the above prepared phosphor coating slurries of G (green), B (blue) and R (red) was coated thereon in order, and each color phosphor film was formed, respectively by photoprinting method (exposure and development) to form a phosphor screen of a color cathode ray tube.

Each color phosphor film thus obtained was irradiated with light, and light and shade of an image based on light transmission through each color phosphor film was analyzed. As this result, a phosphor film, the light transmission of which is small, was evaluated that its phosphor packing density in the phosphor film was satisfactory. Marks in the Table indicate as follows:

⊙ mark: Good packing density

○ mark: Fair packing density

× mark: Poor packing density (b) Cross Contamination

In the preparation of a phosphor film in the above Examples and Comparative Examples, a degree of deteriorating a color purity of the former coated phosphor film by remaining and depositing phosphor particles of the latter coated phosphor film on the former coated phosphor film, was evaluated by measuring number of the remained and deposited phosphor particles by visually observing with a microscope.

B/G: B (blue) contamination on G (green) phosphor film

R/G: R (red) contamination on G (green) phosphor film

R/B: B (blue) contamination on R (red) phosphor film

○ mark: No cross contamination was observed.

Δ mark: A slight contamination was observed, and cross contamination was fair.

× mark: A substantial contamination was observed, and cross contamination was severe.

(2) Surface Charge Properties (a) Isoelectric Point Value of Zeta Potential

A predetermined amount of phosphor was added to 0.01N KCl electrolyte aqueous solution to form a slurry, and pH of the slurry was adjusted with NaOH and HCl to measure pH zeta potential curve by using Zetasizer IIC manufactured by Malvern Co., and pH value, at which zeta potential of the curve becomes 0, was determined to be an isoelectric point.

(b) Blow-Off Charge

Blow-off charge of a phosphor was measured in the following manner. Predetermined surface-treated and dried phosphor particles were subjected to a 500 mesh stainless sieve. The phosphor particles thus obtained and PVA-coated beads of a particle size of from 200 to 800 μm were placed in a bottle with a wide opening, and the phosphor particles and the PVA-coated beads were made into contact by vibration. Thereafter, by using a charged amount-measuring device of blow-off powder (Model TB-200) manufactured by Toshiba Chemical Co., a mixture of the phosphor particles and the PVA-coated beads was placed in a measuring container (Faraday cage), and a high pressure nitrogen ($N_2$) gas was blown thereinto for a predetermined time to blow-off the phosphor particles. Thereafter, a charged amount in the Faraday cage was measured, and a charge (μC/g) generated when contacting with the PVA-coated beads was determined to be a blow-off charged amount.

TABLE 1

| | | Phosphor film property | Surface electric charge properties | | | | |
| | | | Cross contamination | | | Isoelectric point values of zeta | Blow-off electric charge |
| | | Packing density | B/G | R/G | R/B | potential | (μC/g) |
|---|---|---|---|---|---|---|---|
| Example 1 | Green | ⊙ | — | — | — | 4 | +12 |
| | Blue | ⊙ | ⊙ | — | — | 4 | +10 |
| | Red | ⊙ | — | ⊙ | ⊙ | 4 | +5 |
| Example 2 | Green | ⊙ | — | — | — | 3 | +8 |
| | Blue | ⊙ | — | — | — | 4 | +10 |
| | Red | ⊙ | — | ⊙ | ⊙ | 5 | +5 |

TABLE 1-continued

| | | Phosphor film property | Cross contamination | | | Isoelectric point values of zeta | Blow-off electric charge |
|---|---|---|---|---|---|---|---|
| | | Packing density | B/G | R/G | R/B | potential | ($\mu C/g$) |
| Example 3 | Green | ⊚ | — | — | — | 4 | +12 |
| | Blue | ⊚ | ⊚ | — | — | 3 | +8 |
| | Red | ⊚ | — | ⊚ | ⊚ | 5 | +5 |
| Example 4 | Green | ⊚ | — | — | — | 4 | +12 |
| | Blue | ⊚ | ⊚ | — | — | 4 | +10 |
| | Red | ⊚ | — | ⊚ | ⊚ | 5 | +8 |
| Comparative Example 1 | Green | ○ | — | — | — | 3 | 0 |
| | Blue | ○ | X | — | — | 4 | +1 |
| | Red | ○ | — | X | X | 4 | +3 |
| Comparative Example 2 | Green | ○ | — | — | — | 3 | 0 |
| | Blue | ○ | ○-X | — | — | 4 | +10 |
| | Red | ○ | — | X | ○ | 4 | +3 |
| Comparative Example 3 | Green | X | — | — | — | 8 | +5 |
| | Blue | X | ⊚ | — | — | 8 | +8 |
| | Red | X | — | ⊚ | ⊚ | 8 | +6 |

The phosphors of the Examples of the present invention, which contain a quaternary ammonium salt and have a water-insoluble silane compound deposited on the phosphor surface, were evaluated to have a satisfactory "phosphor packing density" in a phosphor film and to satisfactorily prevent "cross contamination". Thus, the phosphor film of the present invention provided a cathode ray tube having excellent luminance and contrast.

Further, unlike conventional phosphors, the phosphor of the present invention can control a surface charge to a lower value, i.e. at most 5 of an isoelectric point value of zeta potential, and also can control a charge (blow-off charge) of the phosphor particles in air to at least 5 ($\mu C/g$). Thus, a phosphor film obtained thereby can provide a large "cross contamination" in the film, and can satisfactorily prevent "other color face fogging".

Example 5
Treatment of Green Phosphor

In the same manner as in Example 1, an anionic silica sol having an average particle size of 80 m$\mu$ was coated on a green phosphor (ZnS:Cu, Al) for a cathode ray tube.

Thereafter, an aqueous solution containing a cationized polydiallyl quaternary ammonium salt-containing compound in an amount of 500 ppm to the phosphor, was prepared, and the aqueous solution thus prepared was added to the above slurry containing the phosphor coated with the silica sol to deposit the quaternary ammonium salt-containing compound on the phosphor surface. Thereafter, the product was dehydrated and dried, and was subjected to a 500 mesh stainless-made sieve to loosen aggregated phosphors, thus obtaining a green phosphor.

Treatment of Blue Phosphor

In the same manner as in Example 1, an anionic acrylic resin binder having an average particle size of 80 m$\mu$ and 1.2% cobalt aluminate blue pigment were coated on the surface of a blue phosphor (ZnS:Ag, Cl) for a cathode ray tube. Thereafter, an anionic silica sol having an average particle size of 80 m$\mu$ was deposited on the pigment-coated phosphor in the aqueous slurry.

Thereafter, an aqueous solution was prepared by dissolving a cationized polyvinyl alcohol as a quaternary ammonium salt-containing compound in an amount of 500 ppm to the phosphor in water, and the aqueous solution thus prepared was added to the aqueous slurry of the above phosphor coated with the above anionic acryl emulsion and silica sol, thereby depositing the quaternary ammonium salt-containing compound on the topmost surface of the phosphor. The product thus obtained was then dehydrated and dried and was subjected to a 500 mesh stainless-made sieve to loosen aggregated phosphors, thereby obtaining a blue phosphor.

Treatment of Red Phosphor

The above treatment of blue phosphor was repeated to deposit red iron oxide red pigment particles and anionic compound particles on a red phosphor, except that a red phosphor ($Y_2O_2S$:Eu) for a cathode ray tube was used in place of the blue phosphor (ZnS:Ag, Cl) as a phosphor and that 0.08% red iron oxide red pigment particles were used in place of 1.2% cobalt aluminate blue pigment particles.

Thereafter, an aqueous solution was prepared by dissolving a lauryldimethylbenzylammonium chloride surfactant as a quaternary ammonium salt-containing compound in an amount of 300 ppm to the phosphor in water, and the aqueous solution thus prepared was added to the above slurry of the phosphor coated with the above anionic compound to deposit the quaternary ammonium salt-containing compound on the phosphor surface. Thereafter, the product was dehydrated and dried, and was subjected to a 500 mesh stainless-made sieve to loosen aggregated phosphors, thus obtaining a red phosphor.

In the same manner as in Example 1, three color G, B and R phosphor films were prepared by using the above prepared phosphors in accordance with slurry-coating method, and "packing density of phosphor in phosphor film" and cross contaminations "B/G", "R/G" and "R/B" were observed.

Example 6

Each color phosphor was prepared in the same manner as in Example 5, except that the amount of the quaternary ammonium salt deposited on the blue phosphor surface was changed from 500 ppm to 200 ppm, and a phosphor film was prepared in the same manner as in Example 1 by using the above prepared phosphor. Thereafter, "packing density of phosphor in phosphor film" and cross contaminations "B/G", "R/G" and "R/B" were observed.

Example 7

Each color phosphor was prepared in the same manner as in Example 5, except that the amount of the quaternary ammonium salt deposited on the green phosphor surface was changed from 500 ppm to 200 ppm, and a phosphor film was prepared by using the phosphor thus obtained in the same manner as in Example 1. Thereafter, "packing density of phosphor in phosphor film" and cross contaminations "B/G", "R/G" and "R/B" were observed.

Example 8

Each color phosphor was prepared in the same manner as in Example 7, except that a silica sol (anionic compound particle) having a particle size of 150 mμ, together with an anionic silica sol having a particle size of 80 mμ, in an amount of 2,000 ppm to the phosphor, was deposited as anionic compound particles to be deposited on a green phosphor surface. A phosphor film was prepared in the same manner as in Example 1 by using the above prepared phosphor, and "packing density of phosphor in phosphor film" and cross contaminations "B/G", "R/G" and "R/B" were observed.

Example 9

Each color phosphor was prepared in the same manner as in Example 8, except that a silica sol having a particle size of 270 mμ was used in place of the silica sol having a particle size of 150 mμ as an anionic compound particle, and a phosphor film was prepared in the same manner as in Example 1 by using the phosphor thus obtained. Thereafter, "packing density of phosphor in phosphor film" and cross contaminations "B/G", "R/G" and "R/B" were observed.

Example 10

Each color phosphor was prepared in the same manner as in Example 7, except that polystyrene having a particle size of 200 mμ as a nonionic compound particle, together with an anionic silica sol having a particle size of 80 mμ as an anionic compound particle, in an amount of 1,000 ppm to the phosphor, was deposited on a green phosphor surface, and a phosphor film was prepared by using the above prepared phosphor in the same manner as in Example 1. Thereafter, "packing density of phosphor in phosphor film" and cross contaminations "B/G", "R/G" and "R/B" were observed.

Comparative Example 4

Each color phosphor was prepared in the same manner as in Example 5, except that the quaternary ammonium salt-containing compound to be deposited respectively on green, blue and red phosphor surfaces, was omitted. A phosphor film was prepared by using the above prepared phosphor in the same manner as in Example 1, and "packing density of phosphor in phosphor film" and cross contaminations "B/G", "R/G" and "R/B" were observed.

Comparative Example 5

Each color phosphor was prepared in the same manner as in Example 5, except that the quaternary ammonium salt-containing compound to be deposited respectively on green and red phosphor surfaces, was omitted. A phosphor film was prepared by using the above prepared phosphor in the same manner as in Example 1, and "packing density of phosphor in phosphor film" and cross contaminations "B/G", "R/G" and "R/B" were observed.

Comparative Example 6

Each color phosphor was prepared in the same manner as in Example 5, except that a cationic alumina sol in an amount of 1,000 ppm to the phosphor was used in place of the quaternary ammonium salt-containing compound and a zinc sulfate aqueous solution was added to adjust pH. A phosphor film was prepared by using the above prepared phosphor in the same manner as in Example 1, and "packing density of phosphor in phosphor film" and cross contaminations "B/G", "R/G" and "R/B" were observed.

Evaluation

With regard to phosphor films of Examples 5 to 10 and Comparative Examples 4 to 6, isoelectric point values of surface charge zeta potential, blow-off charge and phosphor film properties (packing density of phosphor in phosphor film and cross contamination) were evaluated, and their results are shown in the following Table 2. Each evaluation method in Table 2 was carried out in the same manner as in Examples 1 to 4 (Table 1).

TABLE 2

| | | Phosphor film property | Surface electric charge properties | | | | |
| --- | --- | --- | --- | --- | --- | --- | --- |
| | | | Cross contamination | | | Isoelectric point values of zeta potential | Blow-off electric charge ($\mu C/g$) |
| | | Packing density | B/G | R/G | R/B | | |
| Example 5 | Green | ○ | — | — | — | 7 | +16 |
| | Blue | ○ | ⊙ | — | — | 7 | +14 |
| | Red | ○ | — | ⊙ | ⊙ | 7 | +12 |
| Example 6 | Green | ○ | — | — | — | 7 | +16 |
| | Blue | ⊙ | ⊙-○ | — | — | 5 | +5 |
| | Red | ○ | — | ○ | ○ | 7 | +12 |
| Example 7 | Green | ⊙ | — | — | — | 5 | +8 |
| | Blue | ○ | ⊙ | — | — | 7 | +14 |
| | Red | ○ | — | ⊙ | ⊙ | 7 | +12 |
| Example 8 | Green | ⊙ | — | — | — | 4 | +6 |
| | Blue | ○ | ⊙ | — | — | 7 | +14 |
| | Red | ○ | — | ⊙ | ⊙ | 7 | +12 |
| Example 9 | Green | ⊙ | — | — | — | 4 | +6 |
| | Blue | ○ | ⊙ | — | — | 6 | +8 |
| | Red | ○ | — | ⊙ | ⊙ | 7 | +12 |
| Example 10 | Green | ⊙ | — | — | — | 6 | +10 |
| | Blue | ○ | ⊙ | — | — | 7 | +14 |
| | Red | ○ | — | ⊙ | ⊙ | 7 | +12 |

TABLE 2-continued

| | | Phosphor film property | Surface electric charge properties | | | | |
|---|---|---|---|---|---|---|---|
| | | | Cross contamination | | | Isoelectric point values of zeta | Blow-off electric charge |
| | | Packing density | B/G | R/G | R/B | potential | ($\mu$C/g) |
| Comparative Example 4 | Green | ◉ | — | — | — | 3 | 0 |
| | Blue | ◉ | X | — | — | 4 | +1 |
| | Red | ◉ | — | X | X | 4 | +1 |
| Comparative Example 5 | Green | ◉ | ○ | — | — | 3 | 0 |
| | Blue | ○ | X | — | ○ | 7 | +14 |
| | Red | ◉ | — | X | X | 4 | +1 |
| Comparative Example 6 | Green | X | — | — | — | 8 | +6 |
| | Blue | X | — | — | — | 8 | +7 |
| | Red | X | ◉-○ | ◉-○ | ◉-○ | 8 | +1 |

As evident from Examples 5 to 10 in Table 2, a phosphor providing an isoelectric point value of zeta potential of at most 7 and a blow-off electric charge of at least 5 $\mu$C/g provides a phosphor film having a satisfactory phosphor packing density and satisfactorily preventing cross contamination.

On the other hand, as in Comparative Example 4, each phosphor film having a blow-off charge value of at most 5 $\mu$C/g has a fair packing density of phosphor in the phosphor film but provides a poor fogging property. Also, as in Comparative Example 5, when green and red phosphor films adjacent to a blue phosphor film have low blow-off charge values, fogging properties are unstable and are easily varied. Further, as in Comparative Example 6, when a cationic alumina sol is deposited, a zeta potential becomes high and a phosphor packing density in a phosphor film becomes poor as compared with the case of using a quaternary ammonium salt-containing compound.

As mentioned above, the present invention provides a phosphor having an appropriate surface potential (isoelectric point value of zeta potential and blow-off charge), and a phosphor film prepared therefrom has an improved phosphor packing density and prevents cross contamination.

What is claimed is:

1. A phosphor having a surface coated with a metal alkoxide containing a quaternary ammonium salt.

2. The phosphor according to claim 1, wherein the metal alkoxide has the following general formula:

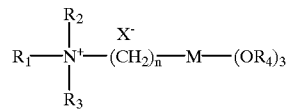

$R_1$ to $R_3$: a $C_1$–$C_{24}$ alkyl or allyl group $R_4$: a $C_1$–$C_4$ alkyl group M: Si, Ti or Zr X: a halogen ion n: an integer of from 1 to 8.

3. The phosphor according to claim 2, wherein M is a Si element.

4. The phosphor according to claim 1, wherein the phosphor surface has an anionic organic compound and/or inorganic compound coating under the metal alkoxide coating.

5. A phosphor having a surface coated with nonionic or anionic compound particles and a quaternary ammonium salt-containing compound.

6. The phosphor according to claim 5, wherein the anionic compound is a silicon compound and/or carboxy-modified acrylic resin.

7. The phosphor according to claim 5, wherein the nonionic compound is polystyrene resin.

* * * * *

UNITED STATES PATENT AND TRADEMARK OFFICE
CERTIFICATE OF CORRECTION

PATENT NO. : 6,020,067

DATED : February 1, 2000

INVENTOR(S): Tetsuji IWAMA et al.

It is certified that an error appears in the above-identified patent and that said Letters Patent is hereby corrected as shown below:

On the title page, item [54] and at the top of Column 1, the title is incorrectly listed. It should be:

--[54] PHOSPHOR HAVING SURFACE COATED WITH A
QUATERNARY AMMONIUM SALT-CONTAINING COMPOUND--

Signed and Sealed this

Twenty-seventh Day of March, 2001

*Attest:*

NICHOLAS P. GODICI

*Attesting Officer*  *Acting Director of the United States Patent and Trademark Office*